(12) United States Patent
Smith et al.

(10) Patent No.: US 10,955,256 B2
(45) Date of Patent: Mar. 23, 2021

(54) MAPPING SYSTEM AND METHOD FOR APPLYING TEXTURE TO VISUAL REPRESENTATIONS OF BUILDINGS

(71) Applicant: HERE GLOBAL B.V., Eindhoven (NL)

(72) Inventors: Kenneth M. Smith, Evanston, IL (US); Jeffrey R. Bach, Aurora, IL (US); Mark Thompson, Lake Forest Park, WA (US); Mitchel Deason, Riverside, IL (US); Marc Fredrickson, San Diego, CA (US)

(73) Assignee: HERE GLOBAL B.V., Eindhoven (NL)

( * ) Notice: Subject to any disclaimer, the term of this patent is extended or adjusted under 35 U.S.C. 154(b) by 218 days.

(21) Appl. No.: 16/171,562

(22) Filed: Oct. 26, 2018

(65) Prior Publication Data
US 2020/0132495 A1 Apr. 30, 2020

(51) Int. Cl.
*G01C 21/36* (2006.01)
*G06T 7/49* (2017.01)
(Continued)

(52) U.S. Cl.
CPC ....... *G01C 21/3638* (2013.01); *G01C 21/367* (2013.01); *G06F 16/29* (2019.01); *G06T 7/49* (2017.01); *G06T 15/04* (2013.01)

(58) Field of Classification Search
CPC .... G01C 21/3628; G01C 21/367; G06T 7/49; G06T 15/04; G06F 16/29
See application file for complete search history.

(56) References Cited

U.S. PATENT DOCUMENTS 5,255,352 A * 10/1993 Falk ................... G05B 19/4099
345/427
5,877,779 A * 3/1999 Goldberg ................ G06T 15/04
345/419
(Continued)

FOREIGN PATENT DOCUMENTS

WO WO 2005/057503 A1 * 6/2005 ............. G06T 17/50

OTHER PUBLICATIONS

Becker, S., *Towards Complete LOD3 Models—Automatic Interpretation of Building Structures*, Photogrammetric Week '11 (2011) 39-56.
(Continued)

*Primary Examiner* — Calvin Cheung
(74) *Attorney, Agent, or Firm* — Alston & Bird LLP

(57) ABSTRACT

A mapping system, method and computer program product are provided to apply texture, such as windows and doors, to the visual representation of a plurality of buildings. In the context of a method, images of each of a plurality of buildings are analyzed to detect building texture for one or more faces of the buildings. A representation of the building texture is spread to visual representations of one or more faces of a respective building that do not have a detected texture. The building texture may be spread from another face of the same building that has detected texture and is of a corresponding size to the face of the building without detected texture. Or, the building texture may be spread from a face of a neighboring building has a detected texture and is of a corresponding size to the face of the building without detected texture.

20 Claims, 6 Drawing Sheets

(51) Int. Cl.
*G06T 15/04* (2011.01)
*G06F 16/29* (2019.01)

(56) References Cited

U.S. PATENT DOCUMENTS

| | | | | |
|---|---|---|---|---|
| 6,628,278 | B1* | 9/2003 | Ritter | G01C 21/3638 345/419 |
| 6,744,442 | B1* | 6/2004 | Chan | G06T 15/04 345/582 |
| 8,339,394 | B1* | 12/2012 | Lininger | G06T 7/49 345/419 |
| 8,422,825 | B1* | 4/2013 | Neophytou | G06K 9/00214 382/294 |
| 8,717,387 | B1* | 5/2014 | Brewington | G06T 3/0075 345/630 |
| 8,817,067 | B1* | 8/2014 | Fan | H04N 5/23238 348/36 |
| 8,818,076 | B2 | 8/2014 | Shenkar et al. | |
| 8,848,983 | B1* | 9/2014 | Brewington | G06F 16/29 382/109 |
| 9,036,915 | B2 | 5/2015 | Quan et al. | |
| 9,773,313 | B1* | 9/2017 | Klingner | G06T 7/579 |
| 9,886,530 | B2* | 2/2018 | Mehr | G06T 15/04 |
| 2001/0020947 | A1* | 9/2001 | Kurihara | G06T 15/04 345/583 |
| 2003/0080961 | A1* | 5/2003 | Blaho | G06T 15/04 345/426 |
| 2003/0176965 | A1* | 9/2003 | Padmanabhan | G01C 21/20 701/408 |
| 2004/0227766 | A1* | 11/2004 | Chou | G06T 15/04 345/582 |
| 2009/0179895 | A1* | 7/2009 | Zhu | G06T 11/60 345/424 |
| 2009/0273601 | A1* | 11/2009 | Kim | G06T 17/05 345/419 |
| 2010/0045670 | A1* | 2/2010 | O'Brien | G06T 15/04 345/420 |
| 2010/0201682 | A1* | 8/2010 | Quan | G06T 15/04 345/419 |
| 2010/0250109 | A1* | 9/2010 | Johnston | G01C 21/3679 701/532 |
| 2011/0018902 | A1* | 1/2011 | Ofek | G06T 3/4038 345/629 |
| 2011/0140928 | A1* | 6/2011 | Ren | G06T 17/05 340/995.14 |
| 2012/0041722 | A1* | 2/2012 | Quan | G06T 17/05 703/1 |
| 2013/0016112 | A1* | 1/2013 | Burley | G06T 15/04 345/582 |
| 2013/0120387 | A1* | 5/2013 | Mueller | G06T 15/04 345/426 |
| 2013/0321431 | A1* | 12/2013 | Chen | G09B 29/007 345/473 |
| 2014/0320488 | A1* | 10/2014 | Ege | G06T 17/05 345/420 |
| 2015/0029188 | A1* | 1/2015 | Ege | G06T 19/00 345/420 |
| 2015/0073711 | A1* | 3/2015 | Brewington | G01V 11/00 702/5 |
| 2015/0116322 | A1* | 4/2015 | Hatanaka | G06T 15/04 345/420 |
| 2015/0143301 | A1* | 5/2015 | Reinhardt | G09B 29/106 715/848 |
| 2015/0187130 | A1* | 7/2015 | Guskov | G06T 17/05 345/420 |
| 2015/0213572 | A1* | 7/2015 | Loss | G06T 7/12 345/420 |
| 2015/0325044 | A1* | 11/2015 | Lebovitz | G06T 17/00 345/420 |
| 2015/0371112 | A1* | 12/2015 | Sun | G06T 5/20 382/160 |
| 2016/0321837 | A1* | 11/2016 | Dillard | G06T 15/503 |
| 2016/0358344 | A1* | 12/2016 | Palandri | G06T 15/04 |
| 2017/0046875 | A1* | 2/2017 | Xu | G06T 19/006 |
| 2017/0084077 | A1* | 3/2017 | Liu | G06T 17/05 |
| 2017/0200309 | A1* | 7/2017 | Qian | G06T 17/05 |
| 2017/0287201 | A1* | 10/2017 | Tomitaka | G09B 29/00 |
| 2018/0025542 | A1* | 1/2018 | Upendran | G06K 9/00637 345/420 |
| 2018/0253886 | A1* | 9/2018 | Hu | G06T 15/04 |
| 2019/0371056 | A1* | 12/2019 | Wetzel | G01C 15/002 |

OTHER PUBLICATIONS

Haegler, S. et al., *Procedural Modeling for Digital Cultural Heritage*, EURASIP Journal on Image and Video Processing (Dec. 2009) 31 pages.

Nan et al., *Template Assembly for Detailed Urban Reconstruction*, Eurographics 2015, vol. 34, No. 2 (2015) 12 pages.

* cited by examiner

MAPPING SYSTEM AND METHOD FOR APPLYING TEXTURE TO VISUAL REPRESENTATIONS OF BUILDINGS

TECHNOLOGICAL FIELD

An example embodiment relates generally to a mapping system, method and computer program product and, more particularly, to a mapping system, method and computer program product configured to apply texture to visual representations of a plurality of buildings.

BACKGROUND

At least some mapping and navigation systems provide three-dimensional imagery. As such, these mapping and navigation systems may provide three-dimensional representations of buildings, such as the buildings alongside a roadway that forms a portion of a route to be taken. By including three-dimensional representations of the buildings, the resulting graphical representations presented by the mapping or navigation system may more realistically depict the streetscape experienced by a driver or other user.

The three-dimensional representations of buildings presented by some mapping and navigation systems may have blank exterior surfaces, that is, planar surfaces with no windows, doors or other textural features. The resulting representation of the building is relatively simplistic and does not accurately represent the appearance of the buildings. In order to add texture to the building surfaces, generic windows may be added to the faces, such as in a predefined regular pattern. Although the resulting representations of the buildings have some texture in the form of windows, the uniform appearance of the windows may create a relatively unrealistic representation of the buildings in comparison to the appearance of the actual buildings. In order to increase the correlation between the representations of the buildings and the appearance of the buildings themselves, windows and doors have been manually added to the representations of some buildings that are presented by mapping and navigation systems. However, the manual addition of windows or doors to the representations of buildings to be presented by mapping and navigation systems is time consuming and costly and is challenging to scale.

BRIEF SUMMARY

A mapping system, method and computer program product are provided in accordance with an example embodiment in order to apply texture, such as windows and doors, to the visual representation of a plurality of buildings, thereby increasing the visual correspondence between the visual representations of the buildings and the appearance of the buildings themselves. As a result, the resulting mapping system, method and computer program product may visually represent the buildings in a manner that is more realistic and, as such, may provide an enhanced user experience. The mapping system, method and computer program product of an example embodiment apply the texture to the visual representations of the plurality of buildings in a largely automated and accurate manner, thereby increasing the efficiency with which the visual representations of the buildings to be presented by a mapping or navigation system are constructed.

In an example embodiment, a mapping system is provided that is configured to provide visual representations of a plurality of buildings to which texture has been applied. The mapping system includes a map database, at least one processor and at least one memory including computer program code. The at least one memory and the computer program code are configured to, with the processor, cause the mapping system to analyze, for each of the plurality of buildings, images of the buildings to detect building texture for one or more faces of the buildings including windows and doors. The at least one memory and the computer program code are also configured to, with the processor, cause the mapping system to spread a representation of the building texture to visual representations of one or more faces of a respective building that do not have a detected texture. In an instance in which another face of the respective building has the detected texture and is of a corresponding size to the face of the respective building that does not have the detected texture, the mapping system is caused to spread the representation of the building texture by copying the representation of the detected texture of the another face of the respective building onto the visual representation of the face of the respective building that does not have the detected texture. Otherwise, in an instance in which a face of a neighboring building has a detected texture and is of a corresponding size to the face of the respective building that does not have the detected texture, the mapping system is caused to spread the representation of the building texture by copying the representation of the detected texture of the face of the neighboring building onto the visual representation of the face of the respective building that does not have the detected texture. The at least one memory and the computer program code are also configured to, with the processor, cause the mapping system to store the visual representations of the plurality of buildings in association with the map database and, with reference to the map database, to cause a map to be presented upon a display including the visual representations of the plurality of buildings to which texture has been applied.

In an instance in which the another face of the respective building has the detected texture and is a predefined fraction of a size of the face of the respective building that does not have the detected texture, the at least one memory and the computer program code are configured to, with the processor, cause the mapping system of an example embodiment to copy the representation of the detected texture of the another face of the respective building onto the visual representation of the face of the respective building that does not have the detected texture by repeatedly copying and mirroring the representation of the detected texture of the another face of the respective building onto the visual representation of the face of the respective building that does not have the detected texture. In an example embodiment, the at least one memory and the computer program code are further configured to, with the processor, cause the mapping system to determine at least one face of one or more buildings that is visible from a street but that does not have the detected texture. In this example embodiment, the at least one memory and the computer program code are configured to, with the processor, cause the mapping system to spread the representation of the building texture by spreading the representation of the building texture to the visual representation of the at least one face of the one or more buildings that is visible from the street but that does not have the detected texture.

In an instance in which there are a plurality of images of a first building, the at least one memory and the computer program code are configured to, with the processor, cause the mapping system of an example embodiment to analyze images of the buildings by identifying the image of the first building to be analyzed based upon occlusions included in the plurality of images of the first building. The at least one memory and the computer program code are configured to, with the processor, cause the mapping system of an example embodiment to analyze images of the buildings by classifying pixels of the image of a first building as representing a portal or a portion of a façade of the first building and by defining regions of a face of the first building by defining bounding boxes about the portals on the face of the first building and identifying patterns of repeating rows or columns of the bounding boxes. In this example embodiment, the at least one memory and the computer program code may be configured to, with the processor, cause the mapping system to define the regions of the face of the first building by defining the regions based upon a predefined degree of similarity in alignment of the bounding boxes and a size of gaps between the bounding boxes of a respective region.

In another example embodiment, a method is provided for applying texture to visual representations of a plurality of buildings. The method includes, for each of the plurality of buildings, analyzing images of the buildings to detect building texture for one or more faces of the buildings including windows and doors. The method also includes spreading a representation of the building texture to visual representations of one or more faces of a respective building that do not have a detected texture. In an instance in which another face of the respective building has the detected texture and is of a corresponding size to the face of the respective building that does not have the detected texture, the method spreads the representation of the building texture by copying the representation of the detected texture of the another face of the respective building onto the visual representation of the face of the respective building that does not have the detected texture. Otherwise, in an instance in which a face of a neighboring building has a detected texture and is of a corresponding size to the face of the respective building that does not have the detected texture, the method spreads the representation of the building texture by copying the representation of the detected texture of the face of the neighboring building onto the visual representation of the face of the respective building that does not have the detected texture.

The method of an example embodiment also includes providing the visual representations of the plurality of buildings to which texture has been applied to a mapping or navigation system for display. In an instance in which the another face of the respective building has the detected texture and is a predefined fraction of a size of the face of the respective building that does not have the detected texture, the method of an example embodiment copies the representation of the detected texture of the another face of the respective building onto the visual representation of the face of the respective building that does not have the detected texture by repeatedly copying and mirroring the representation of the detected texture of the another face of the respective building onto the visual representation of the face of the respective building that does not have the detected texture.

In an example embodiment, the method further includes determining at least one face of one or more buildings that is visible from a street but that does not have the detected texture. In this example embodiment, the method spreads the representation of the building texture by spreading the representation of the building texture to the visual representations of the at least one face of the one or more buildings that is visible from the street but that does not have the detected texture. In an instance in which there are a plurality of images of a first building, the method of an example embodiment analyzes images of the buildings by identifying the image of the first building to be analyzed based upon occlusions included in the plurality of images of the first building. In an example embodiment, the method analyzes images of the buildings by classifying pixels of the image of a first building as representing a portal or a portion of a façade of the first building and by defining regions of a face of the first building by defining bounding boxes about the portals on the face of the first building and identifying patterns of repeating rows or columns of the bounding boxes. In this example embodiment, the method may define the regions of the face of the first building by defining the regions based upon a predefined degree of similarity in alignment of the bounding boxes and a size of gaps between the bounding boxes of a respective region.

In a further example embodiment, a computer program product is provided that is configured to apply texture to visual representations of a plurality of buildings. The computer program product includes at least one non-transitory computer-readable storage medium having computer-executable program code instructions stored therein with the computer-executable program code instructions including program code instructions configured, upon execution, to analyze, for each of the plurality of buildings, images of the buildings to detect building texture for one or more faces of the buildings including windows and doors. The computer-executable program code instructions also include program code instructions configured, upon execution, to spread a representation of the building texture to visual representations of one or more faces of a respective building that do not have a detected texture. In an instance in which another face of the respective building has the detected texture and is of a corresponding size to the face of the respective building that does not have the detected texture, the program code instructions configured to spread the representation of the building texture comprise program code instructions configured to copy the representation of the detected texture of the another face of the respective building onto the visual representation of the face of the respective building that does not have the detected texture. Otherwise, in an instance in which a face of a neighboring building has a detected texture and is of a corresponding size to the face of the respective building that does not have the detected texture, the program code instructions configured to spread the representation of the building texture comprise program code instructions configured to copy the representation of the detected texture of the face of the neighboring building onto the visual representation of the face of the respective building that does not have the detected texture.

In an example embodiment, the computer-executable program code instructions further include program code instructions configured, upon execution, to cause the visual representations of the plurality of buildings to which texture has been applied to be provided to a mapping or navigation system for display. In an instance in which the another face of the respective building has the detected texture and is a predefined fraction of a size of the face of the respective building that does not have the detected texture, the program code instructions configured to copy the representation of the detected texture of the another face of the respective building onto the visual representation of the face of the respective building that does not have the detected texture include program code instructions configured to repeatedly copy and mirror the representation of the detected texture of the another face of the respective building onto the visual representation of the face of the respective building that does not have the detected texture. In an example embodiment, the computer-executable program code instructions further include program code instructions configured, upon execution, to determine at least one face of one or more buildings that is visible from a street but that does not have the detected texture. In this example embodiment, the program code instructions configured to spread the representation of the building texture include program code instructions configured to spread the representation of the building texture to the visual representation of the at least one face of the one or more buildings that is visible from the street but that does not have the detected texture.

In an instance in which there are a plurality of images of a first building, the program code instructions configured to analyze images of the buildings include program code instructions configured to identify the image of the first building to be analyzed based upon occlusions included in the plurality of images of the first building. In an example embodiment, the program code instructions configured to analyze images of the buildings include program code instructions configured to classify pixels of the image of a first building as representing a portal or a portion of a façade of the first building and to define regions of a face of the first building by defining bounding boxes about the portals on the face of the first building and identifying patterns of repeating rows or columns of the bounding boxes. In this example embodiment, the program code instructions configured to define the regions of the face of the first building may include program code instructions configured to define the regions based upon a predefined degree of similarity in alignment of the bounding boxes and a size of gaps between the bounding boxes of a respective region.

In yet another example embodiment, an apparatus is provided for applying texture to visual representations of a plurality of buildings. The apparatus includes, for each of the plurality of buildings, means for analyzing images of the buildings to detect building texture for one or more faces of the buildings including windows and doors. The apparatus also includes means for spreading a representation of the building texture to visual representations of one or more faces of a respective building that do not have a detected texture. In an instance in which another face of the respective building has the detected texture and is of a corresponding size to the face of the respective building that does not have the detected texture, the means for spreading the representation of the building texture includes means for copying the representation of the detected texture of the another face of the respective building onto the visual representation of the face of the respective building that does not have the detected texture. Otherwise, in an instance in which a face of a neighboring building has a detected texture and is of a corresponding size to the face of the respective building that does not have the detected texture, the means for spreading the representation of the building texture includes means for copying the representation of the detected texture of the face of the neighboring building onto the visual representation of the face of the respective building that does not have the detected texture.

The apparatus of an example embodiment also includes means for providing the visual representations of the plurality of buildings to which texture has been applied to a mapping or navigation system for display. In an example embodiment and in an instance in which the another face of the respective building has the detected texture and is a predefined fraction of a size of the face of the respective building that does not have the detected texture, the means for copying the representation of the detected texture of the another face of the respective building onto the visual representation of the face of the respective building that does not have the detected texture includes means for repeatedly copying and means for mirroring the representation of the detected texture of the another face of the respective building onto the visual representation of the face of the respective building that does not have the detected texture.

In an example embodiment, the apparatus further includes means for determining at least one face of one or more buildings that is visible from a street but that does not have the detected texture. In this example embodiment, the means for spreading the representation of the building texture includes means for spreading the representation of the building texture to the visual representations of the at least one face of the one or more buildings that is visible from the street but that does not have the detected texture. In an example embodiment and in an instance in which there are a plurality of images of a first building, the means for analyzing images of the buildings includes means for identifying the image of the first building to be analyzed based upon occlusions included in the plurality of images of the first building. In an example embodiment, the means for analyzing images of the buildings includes means for classifying pixels of the image of a first building as representing a portal or a portion of a façade of the first building and means for defining regions of a face of the first building by defining bounding boxes about the portals on the face of the first building and identifying patterns of repeating rows or columns of the bounding boxes. In this example embodiment, the means for defining the regions of the face of the first building may include means for defining the regions based upon a predefined degree of similarity in alignment of the bounding boxes and a size of gaps between the bounding boxes of a respective region.

BRIEF DESCRIPTION OF THE DRAWINGS

Figure 1:
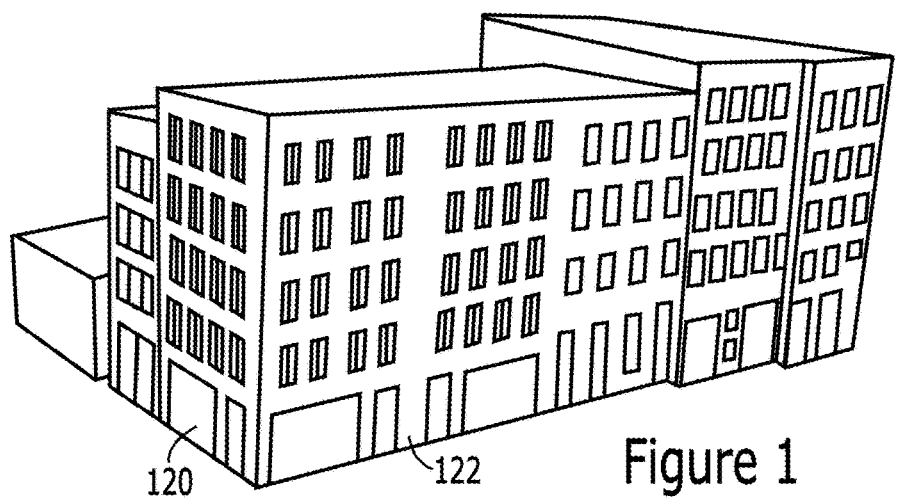
Figure 2:
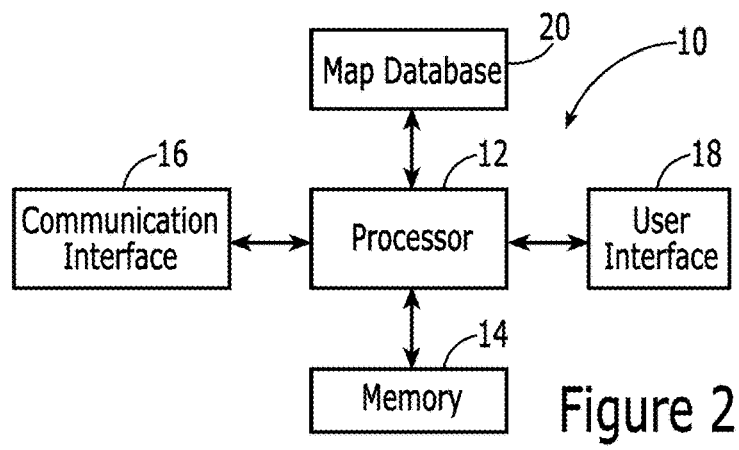
Figure 3:
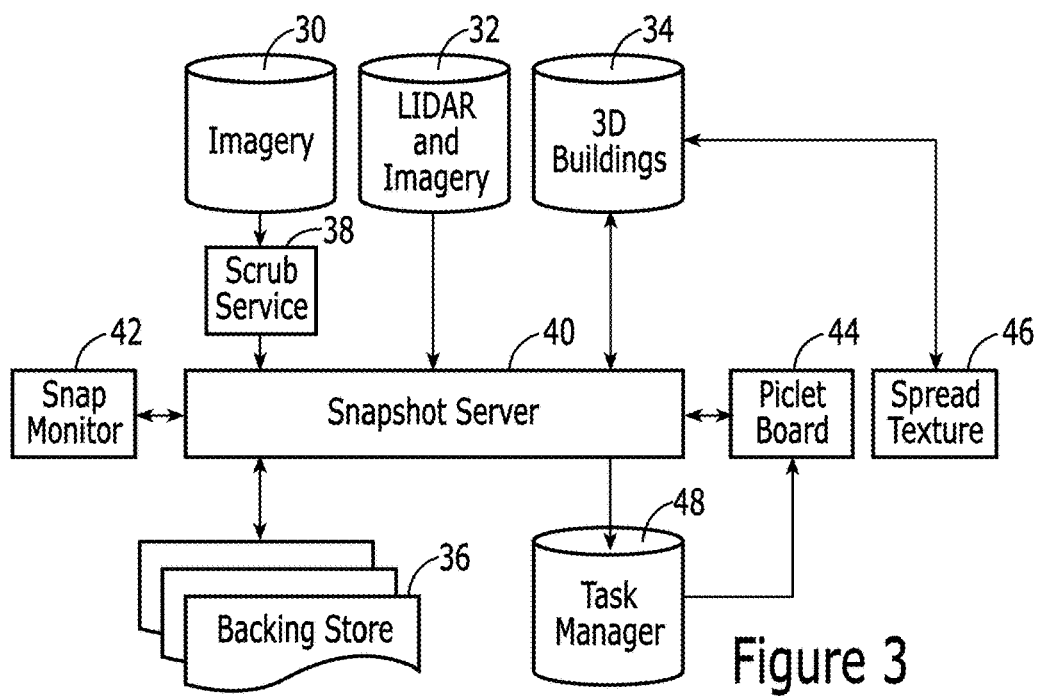
Figure 4:
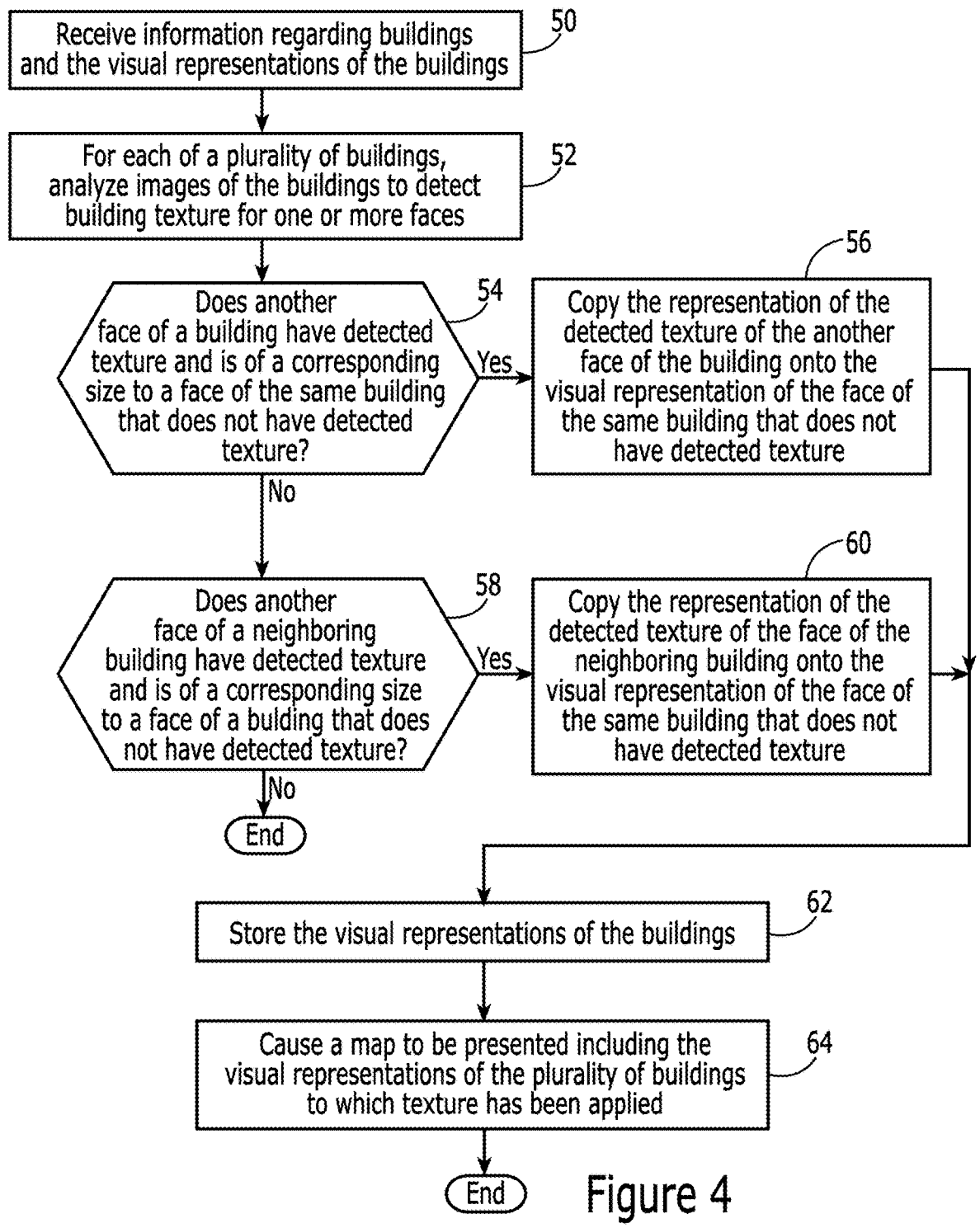
Figure 5:
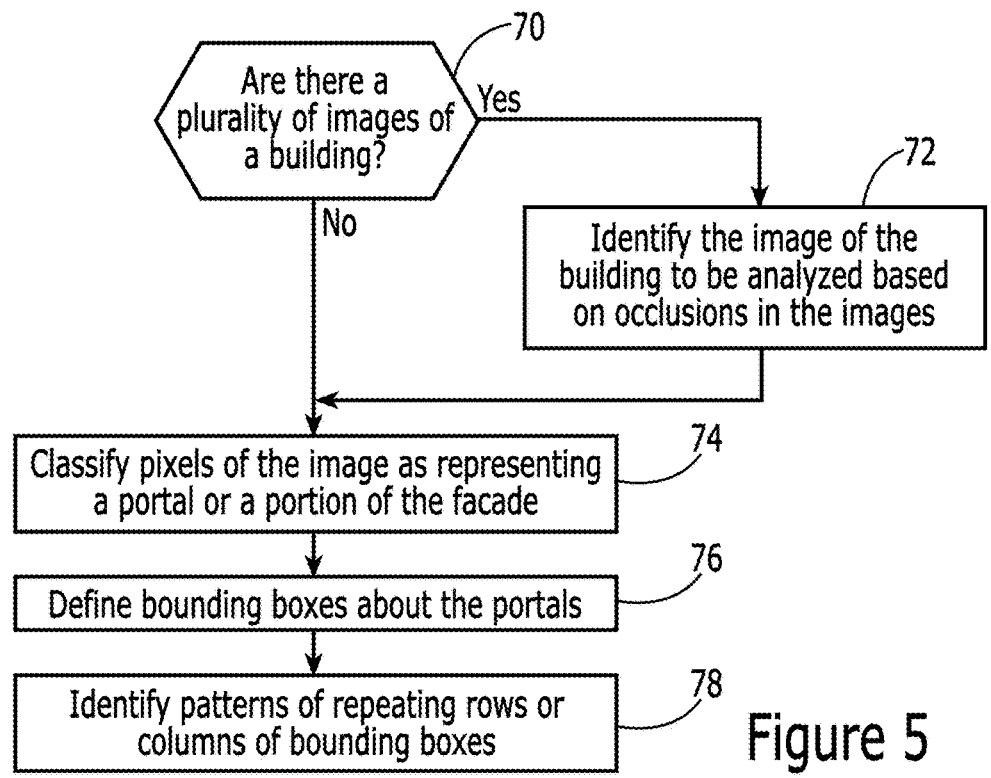
Figure 6A:
Figure 6B:
Figure 7A:
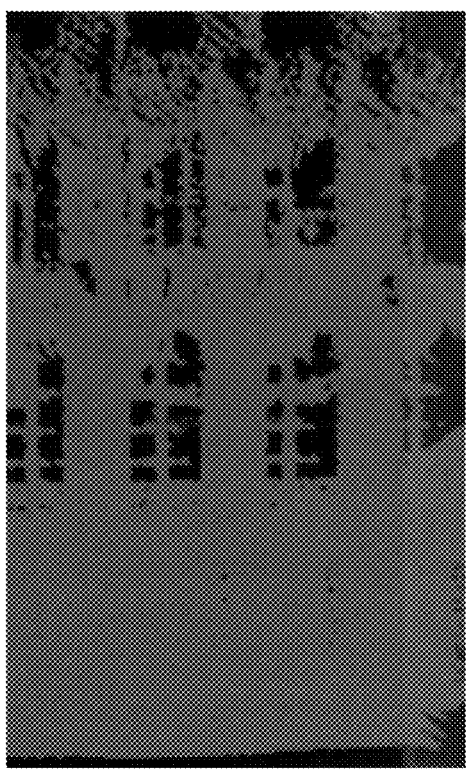
Figure 7B:
Figure 8A:
Figure 8B:
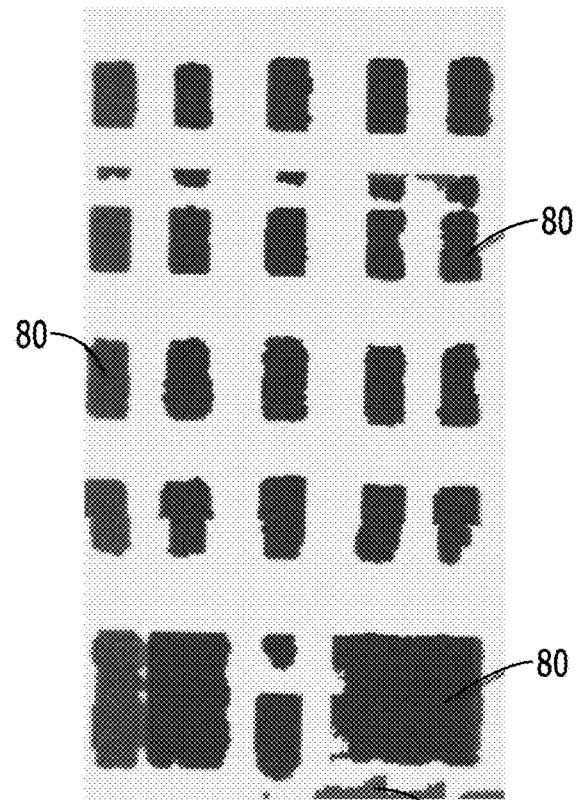
Figure 9:
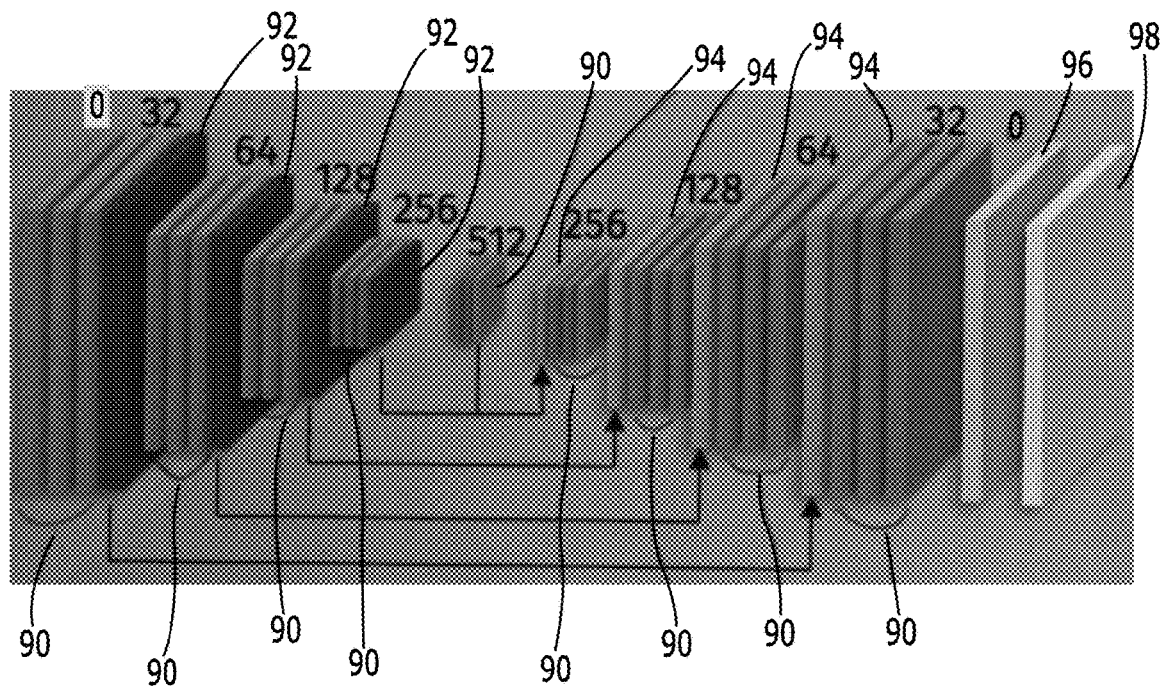

Having thus described the invention in general terms, reference will now be made to the accompanying drawings, which are not necessarily drawn to scale, and wherein:

FIG. 1 is perspective view of the visual representations of a plurality of buildings to which texture, such as windows and doors, has been applied in accordance with an example embodiment of the present disclosure;

FIG. 2 is a block diagram of an apparatus of a mapping system that may be configured in accordance with an example embodiment of the present disclosure;

FIG. 3 is a block diagram of a plurality of components embodied by the apparatus of FIG. 2 in accordance with an example embodiment of the present disclosure;

FIG. 4 is a flow charts illustrating operations performed, such as by the apparatus of FIG. 2, in accordance with an example embodiment of the present disclosure;

FIG. 5 is a flow chart illustrating operations performed, such as by the apparatus of FIG. 2, in order to analyse the images of buildings and to detect building texture in accordance with an example embodiment of the present disclosure;

FIGS. 6A and 6B are images of a building face with different degrees of occlusions;

FIGS. 7A and 7B represent light detection and ranging (LIDAR) reflections from the building faces depicted in the images of FIGS. 6A and 6B, respectively;

FIG. 8A is an image of a building;

FIG. 8B represents the building of FIG. 8A following pixel classification in accordance with an example embodiment of the present disclosure;

FIG. 9 depicts a neural network architecture that provides a convolutional encoder-decoder in order to perform pixel classification in accordance with an example embodiment of the present disclosure.

Figure 10:
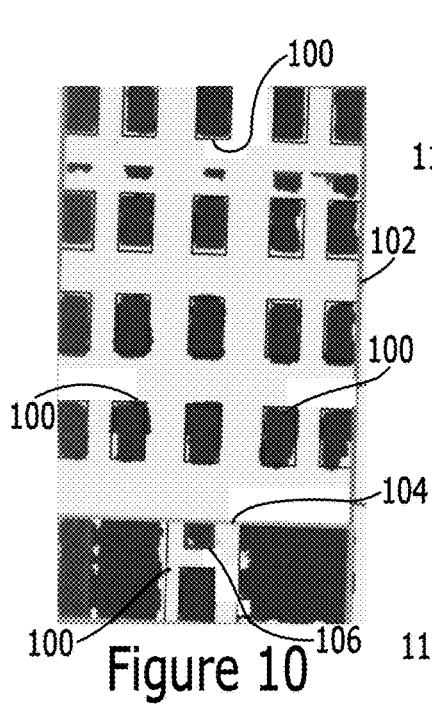
Figure 11:
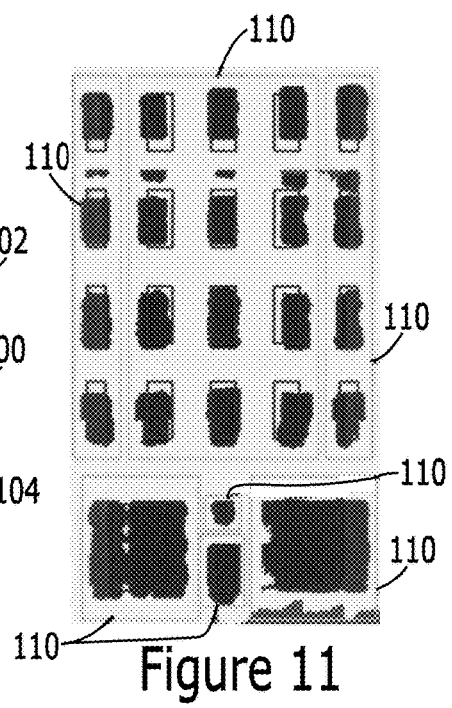
Figure 12:
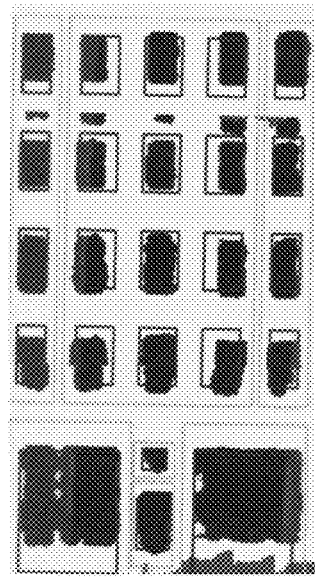
Figure 13:
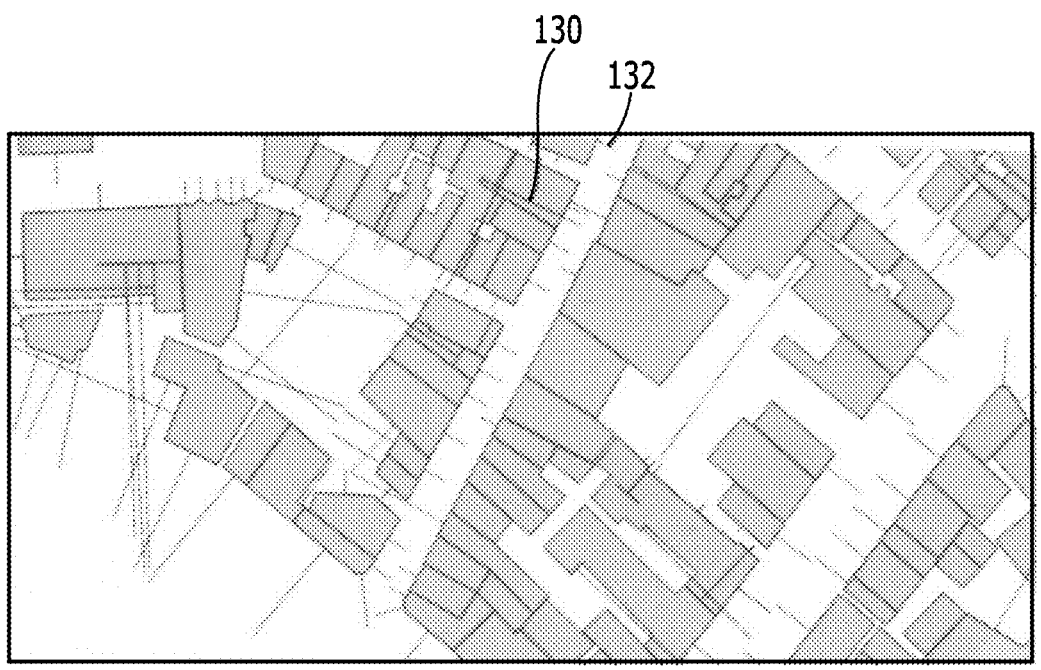

FIG. 10 depicts region segmentation of the portals resulting from the pixel classification of FIG. 8B in accordance with an example embodiment of the present disclosure;

FIG. 11 represents the portals resulting from the pixel classification of FIG. 8B and region segmentation and following grouping by size and shape in accordance with an example embodiment of the present disclosure;

FIG. 12 represents the re-grouped portals based upon the degree of alignment of the portals and the regularity of the spacing of the portals in accordance with the example embodiment of the present disclosure; and FIG. 13 illustrates rays cast from building faces to determine street-level visibility in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A mapping system, method and computer program product are provided in order to provide visual representations of a plurality of buildings to which texture has been applied. In this regard, the mapping system includes, but is not limited to, navigation systems configured to present a three-dimension representation of a map including a three-dimensional representation of one or more buildings. In this regard, the one or more buildings may be located along a roadway to be traversed by a vehicle when driving along a route defined and presented by a navigation system.

As showed in FIG. 1 and in accordance with an example embodiment, the mapping system, method and computer program product of an example embodiment apply texture, such as windows and doorways, to one or more faces of the buildings for which a three-dimensional representation is presented. As such, the three-dimensional representation of a building has a more realistic appearance, thereby enhancing the user experience when referencing the display of the mapping system. As shown by the example of FIG. 1, the faces of the buildings that are visible from the street have texture applied thereto, but the texture varies from building to building with the buildings having different patterns of windows and doorways. Thus, the resulting visual representation of the buildings to which the texture has been applied is more realistic and provides for an improved user experience for a driver or other user of the mapping or navigation system.

The mapping system may embodied by or associated with any of a variety of computing devices including navigation systems. For example, the computing device may be a fixed computing device, such as a built-in vehicular navigation device, an assisted driving device such as an Advanced Driver Assistance System module (ADAS) or the like. Alternatively, the mapping system may be embodied or partially embodied as devices such as a personal digital assistant (PDA), mobile telephone, smart phone, personal navigation device (PND), a portable navigation device, smart watch, computer, camera or other device that can perform navigation-related functions, such as digital routing and map display. An end user can use the mapping system for navigation and map functions such as guidance and map display, for example, and for determination of useful driver assistance information, according to some example embodiments.

Regardless of the manner in which the mapping system is embodied, the mapping system of an example embodiment may include, be associated with or otherwise in communication with an apparatus 10 as shown in FIG. 2. The apparatus may include, be associated with, or may otherwise be in communication with a processor 12, a memory device 14, a communication interface 16 and a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include or otherwise be in communication with a user interface 18. The user interface may include a touch screen display, a speaker, physical buttons, and/or other input/output mechanisms. In an example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14, and/or the like).

The apparatus 10 of an example embodiment may also optionally include a communication interface 16 that may be any means such as a device or circuitry embodied in either hardware or a combination of hardware and software that is configured to receive and/or transmit data from/to other electronic devices in communication with the apparatus. For example, the communication interface may be configured to communicate wirelessly over, for example, Global System for Mobile Communications (GSM), such as but not limited to Long Term Evolution (LTE). In this regard, the communication interface 16 may include, for example, an antenna (or multiple antennas) and supporting hardware and/or software for enabling communications with a wireless communication network. Additionally or alternatively, the communication interface 16 may include the circuitry for interacting with the antenna(s) to cause transmission of signals via the antenna(s) or to handle receipt of signals received via the antenna(s). In some environments, the communication interface may optionally support wired communication and/or may alternatively support vehicle to vehicle or vehicle to infrastructure wireless links.

The apparatus 10 may support a mapping or navigation application so as to present maps or otherwise provide navigation or driver assistance. For example, the apparatus may provide for display of a map and/or instructions for following a route within a network of roads via user interface 18. In order to support a mapping application, the mapping system, such as the apparatus and, in one embodiment, the memory device 14 may include or otherwise be in communication with a map database 20 that includes map data that may include node data, road segment data or link data, point of interest (POI) data, traffic data or the like. The map database may also include cartographic data, routing data, and/or maneuvering data. In an example embodiment, the map database also includes building data that supports the presentation of visual representations of the plurality of buildings including building texture.

According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 20 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 20 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data file (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation, pedestrian navigation, or other types of navigation.

The map database 20 may be a master geographic database that may be accessed by one or more remote systems, such as the traffic control system. In an alternate embodiments, a client side map database may represent a compiled navigation database that may be used in or by the traffic control system in order to provide navigation and/or map-related functions. In such a case, the map database can be downloaded or stored by the traffic control system which can then access the map database in a local manner.

Although the apparatus 10 and, in turn, the mapping system may be configured in a variety of different manners, the mapping system of an example embodiment is depicted in FIG. 3. In this embodiment, the apparatus includes or is in communication with one or more databases, such as a first database 30 for providing image files, a second database 32 for providing a combination of image files and LIDAR files and a third database 34 for storing the visual representations of the buildings, both prior to application of the texture and following the application of the texture. In one embodiment, the map database 20 may embody or otherwise be associated with the third database. The apparatus may also include memory, such as memory device 14 or a database serving as a backing store 36 for storing various files including backup files, e.g., portable network graphics (PNG) and/or JavaScript object notation (JSON) files. Further, the apparatus and, more particularly, the processor 12 of this example embodiment includes: a scrub web service 38 for facilitating computer vision, such as a C++ web service for computer vision; a snapshot server 40, such as a JavaScript server, for providing for parallel batch processing, such as of three dimensional city models; a snap monitor application 42, such as a JavaScript web application, for controlling and monitoring the batch jobs performed by, for example, the snapshot server; a piclet board 44, such as a JavaScript web application, for permitting review of the texture to be applied to visual representations of the buildings and a spread texture process 46, such as a JavaScript batch process, for spreading the texture to faces of a plurality of buildings as described below. By including the foregoing components, the apparatus, such as the processor, of an example embodiment may be configured to execute computer program instructions in order to cause the operations for which the foregoing components are configured to perform.

The operations performed by the apparatus 10 of a mapping system are described below in relation to the flowchart of FIG. 4. As shown in block 50, the apparatus includes means, such as the processor 12 and, in one embodiment, the snapshot server 40 or the like, for receiving information regarding a plurality of buildings and the three-dimensional visual representations of the buildings, such as from the third database 34. The visual representations of the plurality of buildings for which information is received are untextured, either entirely or at least partially with at least some of the visible faces of the buildings lacking windows and doorways. The information regarding the buildings including the visual representations of the plurality of buildings that is received may relate, in one embodiment, to the buildings within a predefined region, such as within a defined city area polygon. In one example embodiment, the apparatus, such as the processor, the snapshot server or the like is configured to filter from the information regarding the buildings including the visual representations of a plurality of buildings the information regarded building(s) to which texture should not be applied, such as the visual representations of three-dimensional landmarks. The data regarding building(s) to which texture should not be applied are then excluded from further consideration in relation to the creation and spreading of building texture described below.

In an example embodiment, the apparatus 10, such as the processor 12, the snapshot server 40 or the like, is configured to then divide the region for which information regarding visual representations of the buildings has been provided into a plurality of sub-regions, termed tiles. Each of the buildings is assigned to one of the tiles. In the example embodiment of FIG. 3, the processor, such as the snapshot server, then processes the visual representations of the one or more buildings for each tile in parallel, such that the buildings associated with the first tile are processed in parallel with the buildings associated with the second tile and typically many other tiles in order to concurrently apply texture to the buildings of each of the tiles. In an embodiment in which the snapshot server processes the visual representations of the buildings for each tile in parallel, the snap monitor application 42 may monitor the progress of the parallel jobs and provide for a display of the status. Thus, the mapping system, method and computer program product of an example embodiment may apply texture to the visual representations of building in a more efficient and timely manner.

As shown in block 52 and for each of the plurality of buildings associated with a respective tile, the apparatus 10 of an example embodiment includes means, such as the processor 12, the snapshot server 40 or the like, for analysing images of the buildings to detect building texture from one or more faces of the building. In this regard, the building texture includes windows and doors. The images of the buildings may be provided by the first and/or second databases 30, 32. In order to detect building texture, the apparatus, such as the processor, the snapshot server, the scrub service 38 or the like, is configured to identify the image of a respective face of a building that was captured from a location closest to the face of the building. The closeness of an image to the face of a building may be defined in various manners. In one embodiment, the information that is received, such as from the third database 34, regarding the visual representation of a building may include information defining the location of the building. In addition, metadata may be associated with an image of a building provided by the first and/or second database that identifies the location from which the image of the building was captured. The apparatus, such as the processor, may then be configured to determine the distance between the location from which the image is captured and the location of the building.

In some instances, the apparatus 10, such as the processor 12 or the like, is configured to identify an image to be sufficiently near the face of a building in an instance in which the image was captured from a location that is within a predefined distance of the building. In this regard, a plurality of images may be identified to be near the building. In this example embodiment and as shown in FIG. 5, the apparatus, such as the processor or the like, is configured to analyse the plurality of images to identify an image that is then utilized in order to detect the building texture. In an instance in which multiple images are identified to be near the face of the building, such as by being captured from within the predefined distance of the building, the apparatus of an example embodiment includes means, such as the processor, the snapshot server 40 or the like, for identifying the image of the building to be analysed in order to detect the building texture based upon occlusions included in the images of the building. See blocks 70 and 72 of FIG. 5. In this regard, the apparatus, such as the processor, the snapshot server or the like, is configured to identify the image having the least occlusions, such as the image having occlusions that cover the least area of the image, as the image to be utilized for detecting building texture.

Although the occlusions of every image may be determined in various manners, the apparatus 10, such as the processor 12, the snapshot server 40 or the like, is configured in an example embodiment to determine the occlusions in an image by analysis of a LIDAR image of the face of the building, such as provided by the second database. In this regard, the apparatus, such as the processor, the snapshot server or the like, is configured to obtain a slice of the LIDAR data that lies within the plane coincident with the face of the building, thereby effectively rendering the LIDAR points from the point of view of the image capture device, e.g., the camera, that captured the image of the building. By way of example, relative to two images of a face of a building depicted in FIGS. 6A and 6B, the LIDAR slices in the plane coincident with the face of a building from a point of view of the image capture device that captured the images shown in FIGS. 6A and 6B are depicted in FIGS. 7A and 7B, respectively. In FIGS. 7A and 7B, pixels that have a lighter color represent LIDAR reflections from the untextured face of the building, while pixels having a darker color may represent texture features of the building, such as windows, or occlusions, such as a van positioned in front of the building. In this example embodiment, the apparatus, such as a processor, the snapshot server or the like, identifies the image for which the corresponding LIDAR slice has the greatest number of pixels having a lighter color as the image to be utilized for detecting building texture since the LIDAR slice and, in turn, the corresponding image will have the fewest occlusions.

Once the image of the face of a building that will be utilized to detect building texture has been identified, the apparatus 10, method and computer program product of an example embodiment detect the building texture from the image. In an example embodiment, the apparatus, method and computer program product of an example embodiment detect the building texture in two phases, namely, pixel classification and region segmentation. With respect to pixel classification, the apparatus of an example embodiment includes means, such as the processor 12, the scrub service 38, the snapshot server 40 or the like, for classifying pixels of the image of the building as representing a portal, such as a window or a door, or a portion of the façade of the building, such as a brick or stucco wall. See block 74 of FIG. 5. Thereafter, pixel classification may be performed in various manners, but, in one embodiment, the apparatus, such as the processor, the scrub service, the snapshot server or the like, includes a neural network, such as a convolutional encoder-decoder, that has been trained to assign each pixel of an image to one of three categories, namely, a portal, such as windows and doors; the façade, such as the untextured face of the building that is not a window or a door; or another category for pixels that do not represent the building, such as pixels representative of an occlusion. By way of example, FIG. 8A is an image of a face of a building and FIG. 8B is a result following pixel classification of the image of the building of FIG. 8A with pixels being classified as representing a portal, the façade or being of another category. In FIG. 8B, pixels having the lighter color have been classified to represent the façade, pixels having a darker color including those designated 80 have been classified to represent a portal and pixels designated as 82 have been classified to be of another category, such as an occlusion.

In an example embodiment, the convolutional encoder-decoder formed by the neural network may have an architecture of the type depicted in FIG. 9 and may be configured to produce a representation of the image built from features extracted by a convolutional network. With reference to FIG. 9, the layers of the neural network that comprise the encoder are layers 0-512 are on the left-hand side, while the layers of the neural network that represent the decoder are layers 512-0 on the right-hand side. The layers that comprise the encoder are trained and, as a result, are configured to extract features, while the layers that represent the decoder are trained and, as a results, are configured to generate a corresponding shape of the feature. The layers of the neural network that comprise the encoder and the decoder include convolution layers, rectified linear unit layers and batch normalization layers, collectively designated as 90. Additionally, the layers of the neural network that comprise the encoder include a maximum pooling layer 92 and the layers of the neural network that comprise the decoder include a transposed convolution layer and a merge layer, collectively designated as 94. The neural network of this example embodiment may also include a two-dimensional convolution layer 96 and a soft max layer 98.

Regardless of its configuration, the neural network may be trained with a plurality of pairs of raw images and corresponding hand labeled images in which the pixels associated with a portal, façade or another category are separately identified. Thus, the apparatus 10, such as the processor 12 or the snapshot server 40 embodying the neural network, such as shown in FIG. 9, is configured to classify the pixels of the image as being pixels representative of a portal, a façade or being within another category in order to produce a classified output image as shown in FIG. 8B.

Following the pixel classification, the mapping system, method and computer program product are configured to perform region segmentation. In this example embodiment, the apparatus 10 includes means, such as the processor 12, the snapshot server 40 or the like, for defining regions of a face of a building by defining bounding boxes about the portals on the face of the building and identifying patterns of repeating rows or columns of the bounding boxes. See blocks 76 and 78 of FIG. 5. In this regard, the apparatus, such as the processor, the snapshot server or the like, is configured to define bounding boxes 100 associated with each blob of pixels that has been classified to be representative of a portal. See FIG. 10. Each bounding box then serves as a candidate portal. In an example embodiment, the mapping system, such as the processor, the snapshot server or the like, is configured to discard candidate portals that are considered too small, such as by having an area that is less than a predefined threshold, such as by being less than a predefined percentage of the average area of a candidate portals.

The apparatus 10, such as the processor 12, the snapshot server 40 or the like, of this example embodiment is then configured to group the candidate portals based upon the shape and size of the candidate portals as defined by the respective bounding boxes 100 such that candidate portals having a predefined degree of similarity, such as the same or a similar (e.g., within a predefined tolerance) size and shape, are grouped together with differently sized or shaped candidate portals being placed in a different group. In this regard, FIG. 10 depicts a classified image in which the candidate portals as represented by respective bounding boxes have been grouped into three groups represented by the three boxes designated 102, 104 and 106. In this example embodiment and for each group of candidate portals, the apparatus, such as the processor, the snapshot server or the like, is configured to examine the candidate portals to determine the relative alignment of and gaps between the candidate portals. For example, the candidate portals of each group may be scanned in one or more predefined directions, such as by being scanned both horizontally and vertically, to identify edges of the bounding boxes that are within a predefined distance of one another and to identify gaps between candidate portals that are similarly sized, such as by having a size that differs by no more than a predefined threshold. The apparatus, such as the processor, the snapshot server or the like, of this example embodiment is then configured to regroup the regions based upon the degree of alignment and the regularity of space between the candidate portals of the initial portal groups. In this regard, candidate portals within a respective initial group that are aligned with one another and are consistently spaced from one another are regrouped so as to be in the same group of candidate portals, while candidate portals within the same initial group that are out of alignment of one another and/or are spaced apart by different distances are not regrouped into the same group of candidate portals, but are regrouped as to be in a different group. See, for example, FIG. 11 in which the candidate portals have been regrouped into seven groups 110 based upon the degree of alignment and regularity of spacing between the candidate portals.

The apparatus 10 of an example embodiment, such as the processor 12, the snapshot server 40 or the like, may also be configured to tune candidate portals following the regrouping of the candidate portals in order to bring the candidate portals within a respective group into closer or exact alignment, such as by causing the portals of a respective group (following regrouping) to be spaced apart by a gap of the same size and/or to be more exactly aligned. Further, the apparatus, such as the processor, the snapshot server or the like, is configured in accordance with this example embodiment to assign doorway status to one or more groups of portal candidates on the ground floor that include a single candidate portal. Consistent with the foregoing example of FIGS. 10 and 11, FIG. 12 depicts the candidate portals following tuning by the mapping system.

In an example embodiment, the apparatus 10, such as the processor 12, the snapshot server 14 or the like, is configured to determine the confidence in the detection of the portals from the face of the building. The confidence may be determined in various manners. In an example embodiment, however, the apparatus, such as the processor, the snapshot server or the like, is configured to determine the confidence based upon a comparison of size and/or shape between the candidate portals following regrouping, such as shown in FIG. 11 and the blobs of pixels classified as candidate portals portal in the classified image following pixel classification, such as shown in FIG. 8B. The building texture that is detected, as represented by the portals outlined by the bounding boxes following pixel classification and region segmentation, may be stored along with the confidence value. In this regard, the image of the face of the building that was identified for use in conjunction with the identification of building texture as well as the resulting metadata describing the building texture and the corresponding confidence value may be stored with the image stored in backing store 36, for example, as a PNG file and the metadata stored, for example, as a JSON file for subsequent review and/or for updating of the third database 34 and/or the map database 20.

Although the mapping system, method and computer program product may be configured to detect the building texture and then spread the building texture to the visual representations of the buildings in a fully automated manner, the mapping system, method and computer program product of an example embodiment permit the building texture that has been identified for the face of a building to be manually reviewed. In one embodiment, as a result of the manual review, the building texture may be identified by a technician to be perfect, to pass or to fail. Building texture that has been identified to be perfect may be utilized not only for the face of the building upon which the texture is detected, but the texture is also a candidate to be spread to other faces of the same or other buildings. In contrast, building texture that has been identified to pass may be applied to the face of the building upon which the texture is detected, but is not spread to other faces of the same or other buildings. Further, the building texture that has been identified to fail may not be utilized either in conjunction with the face of the building upon which the texture is detected or any other face of the same or other buildings.

In this example embodiment, the manual review may be performed in various manners, in an example embodiment, the apparatus 10, such as the processor 12, the user interface 18, the piclet board 44 or the like, may be caused to present images of faces of buildings along with a representation of the building texture that has been detected, such as represented by bounding boxes 100 corresponding to various portals that are overlaid upon the image of the face of the building. In an embodiment in which the piclet board causes the images to be presented for review, the mapping system may also include a task manager 48 as shown in FIG. 3 to interact with the snapshot server 40 and the piclet board and to monitor the tasks associated with the identification and display of the images and the receipt and storage of the results of the manual review. A technician may then quickly indicate for each individual image whether the corresponding building texture is perfect, passes or fails. In some embodiments, the building texture as represented by the bounding boxes of a plurality of portals may simply be presented without the corresponding image of the face of the building in order to solicit the manual characterization of the building texture. Metadata associated with the characterization of the building texture, such as perfect, pass or fail, may be stored, such as described above in conjunction with other metadata associated with an image.

Building texture, such as the bounding boxes associated with portals, such as windows or doors, that have been characterized as perfect or passing are then applied by the apparatus 10, such as the processor 12, the snapshot server 40 or the like, to the face of the building that was the subject of the analysis which generated the building texture. The visual representations of the building to which the building texture has been applied may then be stored, such as in the third database 32 and/or the map database 20.

In the following analysis of the images of the faces of a plurality of buildings in order to identify the building texture to be spread to other faces and/or buildings, not all of the visible faces of the buildings will have building texture applied thereto. Instead, some of the faces of the buildings will remain untextured. For example, some faces of the building may not be captured in an image or at least not in an image that was captured from a location sufficiently near the face of the building. Further, some of the faces of the buildings may have been the subject of an image, but the face of the building may have been significantly occluded or the building texture that is detected for the face of the building may fail to accurately represent the actual building texture. As such, a representation of the building texture that has been detected for a face of a building may be spread to one or more faces of the same or other buildings that do not have texture. In this regard, the building texture for a face of the building that has been identified, such as described below, to be perfect may be spread to other faces of the same or other buildings.

As such, the apparatus 10 includes means, such as the processor 12, the spread texture process 46 or the like, for spreading a representation of the building texture to visual representations of one or more faces of a respective building that do not have a detected texture. In an example embodiment and in an instance in which another face of the respective building that has the detected texture is of a corresponding size to the face of the respective building that does not have the detected texture, the apparatus includes means, such as the processer, the spread texture process or the like, for copying the representation of the detected texture of the another face of the respective building onto the visual representation the face of the respective building that does not have the detected texture. See blocks 54 and 56 of FIG. 4. Thus, the building texture that has been detected for one face of a building may be spread to other faces of the same building so long as the other faces are of a corresponding size.

In addition to spreading building texture to another face of the same building, building texture may be similarly spread to one or more faces of other buildings, such as neighboring buildings, that are not otherwise textured. A neighbouring building may be a building that is immediately adjacent the building having a face for which building texture has been detected. Alternatively, a neighbouring building may be within a predefined distance range of the building having a face for which building texture has been detected. In this regard, the distance range may be defined in terms of physical distance, street blocks, number of buildings or the like. In an instance in which the face of a building has a detected texture and is of a corresponding size to the face of a neighboring building that does not have the detected texture, the apparatus 10 includes means, such as the processor 12, the spread texture process 46 or the like, for copying the representation of the detected texture of the face of the building onto the visual representation of the face of the neighboring building that does not have the detected texture. See blocks 58 and 60 of FIG. 4. Thus, the building texture that has been detected for one face of a building may be spread to one or more faces of one or more neighboring buildings so long as the other faces are of a corresponding size.

In an instance in which two or more faces of a building have different detected textures that are of a corresponding size to the face of the same building or a neighboring building that does not have the detected texture, the detected texture that is copied onto the face of the building that does not have the detected texture may be selected in a random manner from the detected textures of the faces of the one or more buildings that are of a corresponding size.

With respect to the corresponding size, building faces may be considered to have a corresponding size in instances in which the faces are of the same size, such has being of an identical size or differing in size by no more than a predefined size differential threshold. In another embodiment, building faces will be considered to be of a corresponding size in an instance in which a face of a building that does not have the detected texture is an integer multiple (either an exact integer multiple or within a predefined size differential threshold) of the size of the face of a building for which the building texture has been detected. For example, the face of a building that does not have the detected texture will be considered to be of a corresponding size in an instance in which the untextured face is two times or three times the size of the face of the building that has the detected texture.

As described above, the building texture may be copied to the face of the building that does not have the detected texture. In instances in which the face of the building that does not have the detected texture is larger than the face of a building that has the detected texture, the building texture may be repeated, such as by being doubled or tripled depending upon the relative sizes of the faces of building(s), such that the building texture fills the face of the building that does not otherwise have a detected texture. In instances in which the building texture is repeated across the face of the building, the building texture may be reversed such that one instance of the building texture copied to the face of the building is reversed in order to form a mirror image of another instance of the building texture that is copied to the same face of the building, thereby varying the appearance in such a manner as to coincide with architectural norms. With respect to FIG. 1, for example, the building texture for the end face 120 of the building may have been detected, but no building texture may have been detected for the front face 122 of the building. Since the front face of the building has a size that is twice as large as the end face of the building, the building texture of the end face may be copied to the front face and the building texture may be repeated, e.g., doubled, in order to fill the front face. In this regard, the different instances of the building texture may be reversed with respect to one another such that the building texture on the left side of the front face is a mirror image of the building texture on the right side of the face, thereby increasing the variations in and realism of the visual representation of the building.

Prior to spreading the representation the building texture to visual representations of one or more faces of a building that does not have a detected texture, the mapping system, method and computer program product of an example embodiment determines faces of buildings that are visible from a street, but that do not have building texture associated therewith. In an example embodiment, the apparatus 10 includes means, such as the processor 12, the spread texture process 46 or the like, for casting a ray from the face of the building that does not have a detected texture as represented, for example, in an overhead view that depicts the footprints of the buildings. As shown in FIG. 13, for example, a ray may be cast from the center point of the face of the building in a direction perpendicular to the face of the building. In this embodiment, the apparatus includes means, such as the processor, the spread texture process or the like, configured to determine whether the ray first intercepts another building as shown with respect to ray 130 (prior to intercepting the street) or first intercepts the street as shown with respect to ray 132 (prior to intercepting another building). In an instance in which the ray first intercepts the street, the face of the building will be considered to be visible from the street and building texture is spread to the face of the building, such as described above. However, in an instance in which the ray first intercepts another building, the face of the building will be considered to not be visible from the street and, as such, building texture will not be spread to the face of the building, thereby conserving processing resources otherwise consumed to unnecessarily spread the building texture to a face that is not visible from the street. In one embodiment, however, the face of the building from which a ray is cast that first intercepts another building may be considered visible is in an instance in which the height of the building exceeds a predetermined height. In this situation for a building having a height exceeding the predetermined height, the face of the building will be considered to be visible and, as such, building texture will be spread thereto even in an instance in which a ray cast from the face of the building first intercepts another building.

In an instance in which detected texture is not copied onto the face of a building that does not have detected texture from either another face of the same building or from a face of a neighbouring building, the apparatus 10 of an example embodiment may include means, such as the processor 12 or the like, for generating artificial texture and for adding the artificial texture to the representation of the face of the building. In this regard, the artificial generation of the texture may simply utilize a predefined texture selected from a library of predefined textures, each of which may be associated with a face of a different size.

As such, the mapping system, method and computer program product of an example embodiment are configured to add texture to a first face of a building by first determining whether another face of the same building of the same size has a detected texture and, if so, copying the detected texture to the first face. However, if there is not another face of the same building of the same size that has a detected texture, the mapping system, method and computer program product of this example embodiment are configured to determine whether another face of the same building that has a detected texture has a corresponding size to that of the first face, such as in an instance in which the first face has a size that is an integer multiple of the size of the another face of the same building that has the detected texture. In this case in which the first face and the another face of the same building are of a corresponding size, the multiple copies of the texture of the another face may be spread to the first face with one copy of the texture being optionally reversed relative to another copy of the texture on the front face such that the copies are mirror images of one another. However, if no other face of the same building has the same or a corresponding size to the first face, the mapping system, method and computer program product of this example embodiment may then consider faces of neighboring buildings that have a detected texture with the detected texture of a face, if any, of a neighboring building that has the same size as the first face being copied to the first face. If the neighboring buildings do not include a face having detected texture that is of the same size of the first face, the detected texture of a face, if any, of a neighboring building that has a corresponding size to that of the first face is copied to the first face. Finally, if neither the same building nor any neighboring building has a face with detected texture that is the same size or a corresponding size to the first face, texture may be artificially generated and applied to the first face of the building.

As noted above, the apparatus 10 includes means, such as the processor 12, the memory device 14, the map database 20, the third database 34 or like, for storing virtual representations of a plurality of buildings including or in association with the detected texture of the faces of the buildings. See block 62 of FIG. 4. With reference to the map database of a mapping system, the apparatus also includes means, such as the processor, the user interface 18 or the like, for causing a map to be presented upon a display including the visual representations of the plurality of buildings to which texture has been applied. See block 64 of FIG. 4. As such, the resulting depiction of the buildings is more realistic and creates an enhanced user experience during reference to and interaction with mapping and/or navigation applications since the texture applied to the faces of many of the buildings will have been derived from actual images of the buildings and, as a result, more closely mimic the actual appearance of the buildings.

FIGS. 4 and 5 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A mapping system configured to provide visual representations of a plurality of buildings to which texture has been applied, the mapping system comprising a map database, at least one processor and at least one memory including computer program code, the at least one memory and the computer program code are configured to, with the processor, cause the mapping system to at least:
   for each of the plurality of buildings, analyze images of the buildings to detect building texture for one or more faces of the buildings including windows and doors;
   spread a representation of the building texture to visual representations of one or more faces of a respective building that do not have a detected texture, wherein spreading the representation of the building texture comprises:

in an instance in which another face of the respective building has the detected texture and is of a corresponding size to the face of the respective building that does not have the detected texture, copying the representation of the detected texture of the another face of the respective building onto the visual representation of the face of the respective building that does not have the detected texture; and otherwise, in an instance in which a face of a neighboring building has a detected texture and is of a corresponding size to the face of the respective building that does not have the detected texture, copying the representation of the detected texture of the face of the neighboring building onto the visual representation of the face of the respective building that does not have the detected texture; and store the visual representations of the plurality of buildings in association with the map database; and with reference to the map database, cause a map to be presented upon a display including the visual representations of the plurality of buildings to which texture has been applied.

2. A mapping system according to claim 1 wherein the at least one memory and the computer program code are configured to, with the processor, cause the mapping system to copy the representation of the detected texture of the another face of the respective building onto the visual representation of the face of the respective building that does not have the detected texture by, in an instance in which the another face of the respective building has the detected texture and is a predefined fraction of a size of the face of the respective building that does not have the detected texture, repeatedly copying and mirroring the representation of the detected texture of the another face of the respective building onto the visual representation of the face of the respective building that does not have the detected texture.

3. A mapping system according to claim 1 wherein the at least one memory and the computer program code are further configured to, with the processor, cause the mapping system to determine at least one face of one or more buildings that is visible from a street but that does not have the detected texture, and wherein the at least one memory and the computer program code are configured to, with the processor, cause the mapping system to spread the representation of the building texture by spreading the representation of the building texture to the visual representations of the at least one face of the one or more buildings that is visible from the street but that does not have the detected texture.

4. A mapping system according to claim 1 wherein the at least one memory and the computer program code are configured to, with the processor, cause the mapping system to analyze images of the buildings by, in an instance in which there are a plurality of images of a first building, identifying the image of the first building to be analyzed based upon occlusions included in the plurality of images of the first building.

5. A mapping system according to claim 1 wherein the at least one memory and the computer program code are configured to, with the processor, cause the mapping system to analyze images of the buildings by:

classifying pixels of the image of a first building as representing a portal or a portion of a façade of the first building; and defining regions of a face of the first building by defining bounding boxes about the portals on the face of the first building and identifying patterns of repeating rows or columns of the bounding boxes.

6. A mapping system according to claim 5 wherein the at least one memory and the computer program code are configured to, with the processor, cause the mapping system to define the regions of the face of the first building by defining the regions based upon a predefined degree of similarity in alignment of the bounding boxes and a size of gaps between the bounding boxes of a respective region.

7. A method of applying texture to visual representations of a plurality of buildings, the method comprising:

for each of the plurality of buildings, analyzing images of the buildings to detect building texture for one or more faces of the buildings including windows and doors; and spreading a representation of the building texture to visual representations of one or more faces of a respective building that do not have a detected texture, wherein spreading the representation of the building texture comprises:

in an instance in which another face of the respective building has the detected texture and is of a corresponding size to the face of the respective building that does not have the detected texture, copying the representation of the detected texture of the another face of the respective building onto the visual representation of the face of the respective building that does not have the detected texture; and otherwise, in an instance in which a face of a neighboring building has a detected texture and is of a corresponding size to the face of the respective building that does not have the detected texture, copying the representation of the detected texture of the face of the neighboring building onto the visual representation of the face of the respective building that does not have the detected texture.

8. A method according to claim 7 further comprises providing the visual representations of the plurality of buildings to which texture has been applied to a mapping or navigation system for display.

9. A method according to claim 7 wherein copying the representation of the detected texture of the another face of the respective building onto the visual representation of the face of the respective building that does not have the detected texture comprises, in an instance in which the another face of the respective building has the detected texture and is a predefined fraction of a size of the face of the respective building that does not have the detected texture, repeatedly copying and mirroring the representation of the detected texture of the another face of the respective building onto the visual representation of the face of the respective building that does not have the detected texture.

10. A method according to claim 7 further comprising determining at least one face of one or more buildings that is visible from a street but that does not have the detected texture, and wherein spreading the representation of the building texture comprises spreading the representation of the building texture to the visual representations of the at least one face of the one or more buildings that is visible from the street but that does not have the detected texture.

11. A method according to claim 7 wherein analyzing images of the buildings comprises, in an instance in which there are a plurality of images of a first building, identifying the image of the first building to be analyzed based upon occlusions included in the plurality of images of the first building.

12. A method according to claim 7 wherein analyzing images of the buildings comprises:
classifying pixels of the image of a first building as representing a portal or a portion of a façade of the first building; and
defining regions of a face of the first building by defining bounding boxes about the portals on the face of the first building and identifying patterns of repeating rows or columns of the bounding boxes.

13. A method according to claim 12 wherein defining the regions of the face of the first building comprises defining the regions based upon a predefined degree of similarity in alignment of the bounding boxes and a size of gaps between the bounding boxes of a respective region.

14. A computer program product configured to apply texture to visual representations of a plurality of buildings, the computer program product comprising at least one non-transitory computer-readable storage medium having computer-executable program code instructions stored therein, the computer-executable program code instructions comprising program code instructions configured, upon execution, to:
for each of the plurality of buildings, analyze images of the buildings to detect building texture for one or more faces of the buildings including windows and doors; and
spread a representation of the building texture to visual representations of one or more faces of a respective building that do not have a detected texture, wherein spreading the representation of the building texture comprises:
in an instance in which another face of the respective building has the detected texture and is of a corresponding size to the face of the respective building that does not have the detected texture, copying the representation of the detected texture of the another face of the respective building onto the visual representation of the face of the respective building that does not have the detected texture; and
otherwise, in an instance in which a face of a neighboring building has a detected texture and is of a corresponding size to the face of the respective building that does not have the detected texture, copying the representation of the detected texture of the face of the neighboring building onto the visual representation of the face of the respective building that does not have the detected texture.

15. A computer program product according to claim 14 wherein the computer-executable program code instructions further comprise program code instructions configured, upon execution, to cause the visual representations of the plurality of buildings to which texture has been applied to be provided to a mapping or navigation system for display.

16. A computer program product according to claim 14 wherein the program code instructions configured to copy the representation of the detected texture of the another face of the respective building onto the visual representation of the face of the respective building that does not have the detected texture comprise program code instructions configured to, in an instance in which the another face of the respective building has the detected texture and is a predefined fraction of a size of the face of the respective building that does not have the detected texture, repeatedly copy and mirror the representation of the detected texture of the another face of the respective building onto the visual representation of the face of the respective building that does not have the detected texture.

17. A computer program product according to claim 14 wherein the computer-executable program code instructions further comprise program code instructions configured, upon execution, to determine at least one face of one or more buildings that is visible from a street but that does not have the detected texture, and wherein the program code instructions configured to spread the representation of the building texture comprise program code instructions configured to spread the representation of the building texture to the visual representations of the at least one face of the one or more buildings that is visible from the street but that does not have the detected texture.

18. A computer program product according to claim 14 wherein the program code instructions configured to analyze images of the buildings comprise program code instructions configured to, in an instance in which there are a plurality of images of a first building, identify the image of the first building to be analyzed based upon occlusions included in the plurality of images of the first building.

19. A computer program product according to claim 14 wherein the program code instructions configured to analyze images of the buildings comprise program code instructions configured to:
classify pixels of the image of a first building as representing a portal or a portion of a façade of the first building; and
define regions of a face of the first building by defining bounding boxes about the portals on the face of the first building and identifying patterns of repeating rows or columns of the bounding boxes.

20. A computer program product according to claim 19 wherein the program code instructions configured to define the regions of the face of the first building comprise program code instructions configured to define the regions based upon a predefined degree of similarity in alignment of the bounding boxes and a size of gaps between the bounding boxes of a respective region.

* * * * *